March 12, 1968 R. H. KROCK ETAL 3,373,320
SOLID ALUMINUM CAPACITOR WITH ALUMINUM FELT ELECTRODES
Filed Nov. 6, 1964

INVENTORS.
RICHARD H. KROCK
GERHART P. KLEIN
BY Robert Levine
ATTORNEY 3,373,320
SOLID ALUMINUM CAPACITOR WITH ALUMINUM FELT ELECTRODES
Richard H. Krock, Peabody, and Gerhart P. Klein, Manchester, Mass., assignors to P. R. Mallory & Co., Inc., Indianapolis, Ind., a corporation of Delaware
Filed Nov. 6, 1964, Ser. No. 409,389
14 Claims. (Cl. 317—230)

ABSTRACT OF THE DISCLOSURE

High surface area electrodes for electrolytic capacitors fabricated by pressing and sintering of attenuated aluminum fibers. The aluminum fibers are randomly arranged and intimately bonded at points of contact with adjoining fibers to provide a porous anode having a density up to about 75 percent of theoretical density.

---

The present invention relates to electrolytic devices and more particularly relates to electrolytic capacitors wherein at least one electrode is of an aluminum felt material.

It is known in the art to produce electrolytic capacitors based on porous slub electrodes of a valve metal such as tantalum. The porous slug electrodes have the advantage over foil electrodes of a high capacity per unit volume and freedom in respect to the shape of the electrodes. The most commonly used electrolyte is manganese dioxide. It has been shown that solid electrolyte aluminum capacitors based on etched foil with manganese dioxide as the solid electrolyte can be produced having properties similar to those of solid tantalum capacitors. However the production of solid electrolyte aluminum capacitors based on either etched or plain aluminum foil poses a number of problems. Since the foil is brittle, it has to be rolled with separators between layers before electrolyte application. Further, the insulating materials used on wet electrolytic capacitors are attacked and decomposed during the manganese dioxide deposition process, therefore, different and more costly insulating means must be used.

Solid aluminum capacitors have a cost advantage over solid tantalum capacitors, and a long standing need has existed to produce an effective solid aluminum electrolytic capacitor. As was previously mentioned, the production of solid aluminum capacitors utilizing etched or plain foil presents a number of problems. Therefore, it is desirable to produce an aluminum slug electrode similar to the porous tantalum slug. However, aluminum powder cannot be used because of the sintering behavior of the aluminum.

Therefore, it as an object of the present invention to produce a solid aluminum electrolytic capacitor.

It is an object of the present invention to provide a solid electrolytic capacitor which utilizes a more economical material than tantalum.

It is an object of the present invention to provide a solid electrolytic capacitor wherein the anode material is easier to process than tantalum due to much lower sintering temperatures and without a vacuum.

It is an object of the present invention to provide a solid electrolytic capacitor having a higher capacitance per unit volume than the conventional solid capacitors.

The present invention, in another of its aspects, relates to novel features of the instrumentalities of the present invention described therein for teaching the principal object of the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate several novel and different embodiments of the present invention and are constructed to function in the most advantageous mode devised for practical application of the basis principles involved in the hereinafter described invention.

Figure 1:
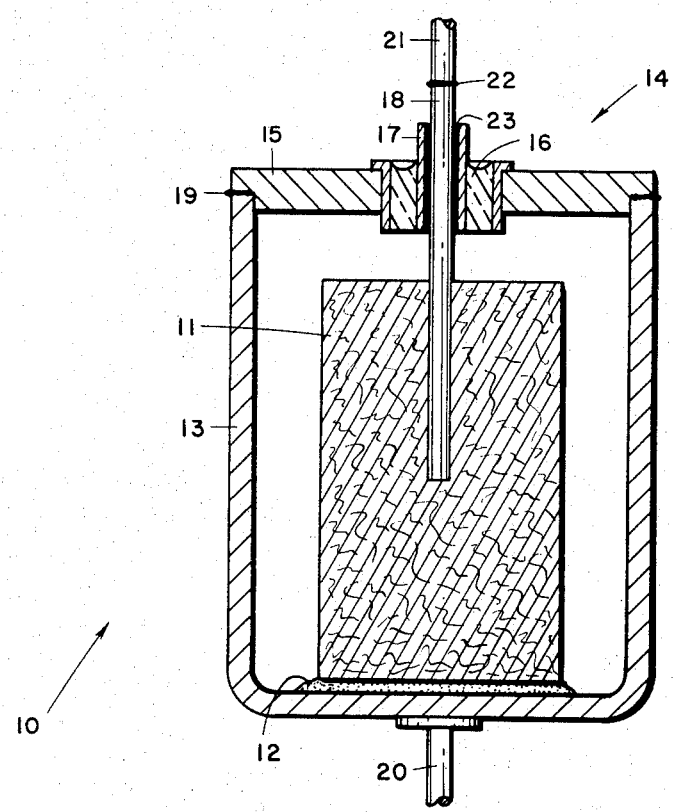
FIGURE 1 is a sectional view of a porous slug, solid aluminum electrolytic capacitor.

Generally speaking the present invention provides a high surface area electrode suitable for solid electrolytic capacitors. The electrode material is produced by the pressing and sintering of extended aluminum, preferably in the form of thin fibers or wool. The advantages of producing capacitor electrodes from aluminum fibers or wool includes: (1) Fibers or wool as the raw material for pressed bodies have the advantage of giving the pressed body a mechanical strength that is difficult to obtain with powder, especially high purity aluminum powder, without the use of binders. The use of binders, however, should be avoided if at all possible in the case of aluminum because of the additional trouble of removing the binder completely with a resulting possibility of contamination. (2) Bodies pressed from fibers or wool characteristically show better interconnections of individual particles than powder because of multiple joint contacts. This is particularly important with aluminum, as it is difficult to sinter because of air formed oxide films existing at the contact areas. This oxide film is not removed in the sintering process. (3) Fibers or wool allow pressing of electrode bodies of almost any shape due to the interlocking of the particles. In particular, the fibers can be used for the production of a thin felt sheet of high porosity and surface area, which in addition may be etched for even larger surface area. The felted sheet can be rolled into a cylindrical shaped electrode of high porosity which could be used for liquid or solid electrolytic capacitors. The use of rigid electrode structures for solid electrolytic capacitors is dictated by the manufacturing procedures for depositing the manganese dioxide counter-electrode. Any kind of mechanical damage to the oxide film of the electrode has to be avoided since short circuits through the oxide could result. Electrical defects in solid electrolyte capacitors can usually not be healed thereafter. (4) The use of felted high purity aluminum sheet may have an advantage over high purity foil for the production of high reliability liquid electrolytic capacitors because of its high surface area which is difficult to obtain with high purity foil. High purity aluminum is difficult to etch because the etching mechanism depends decisively on a certain impurity content of the aluminum, therefore, the purer the aluminum, the more difficult it is to etch.

Felted electrodes for capacitors are prepared by pressing and sintering aluminum wool or fibers of high purity, 99.9% or better, ranging from millimeters to several centimeters in length and diameters in the micron range. The aluminum wool or fibers are compacted in hardened steel dies at pressures from 0 to 20,000 p.s.i. in order to obtain compacts with densities up to 75% of the theoretical density. The pressing pressure to obtain the desired density will increase with increasing fiber size and hardness of the fiber. Sintering is carried out in a vacuum at or near the softening temperature of aluminum. The time, temperature and vacuum conditions are as generally applicable to sintering.

Figure 2:
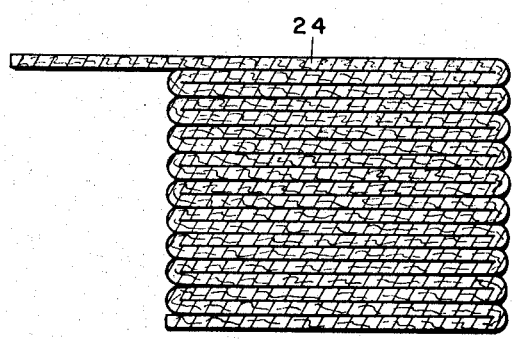
FIGURE 2 is a cut-away view of a folded, aluminum felt electrode which is applicable to liquid or solid electrolytic capacitors.
Figure 3:
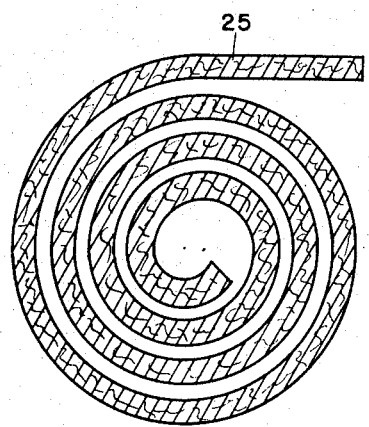
FIGURE 3 is a cut-away view of a rolled cylindrical aluminum felt electrode which is applicable to liquid or solid electrolytic capacitors.

Felted foil is made from aluminum fibers in a process similar to paper production. The fibers are suspended in a suitable, non-corrosive liquid such as a hydrocarbon, organic alcohol, etc. and allowed to settle on a metal or other suitable screen. The raw felt is dried, pressed and sintered under similar conditions as hereinbefore described. The felted foil is cut into strips and either rolled into cylindrical shapes as shown in FIGURE 3 or folded as in FIGURE 2.

If the electrode is to be used for liquid electrolyte capacitors, the electrode is anodized to voltages below the breakdown or scintillation voltage of the particular electrolyte to be used. The anodized electrodes are then processed in the standard way.

For solid electrolyte capacitors, the electrodes are rinsed, dried and vacuum impregnated with an aqueous solution of manganese nitrate. The pyrolysis of manganese nitrate takes place at temperatures between 200–400° C. The exposure to these temperatures should be kept as short as possible. Repeated impregnations with manganese nitrate and intermediate reformations to voltages close to the original formation voltage may be required in order to obtain satisfactory results. The last step prior to the encapsulation is the application of a conductive layer of graphite and metal by spraying or dipping processes common in the production of solid electrolytic capacitors.

FIGURE 1 shows one embodiment of the present invention. Capacitor 10 comprises a porous aluminum anode 11 which is produced by pressing and sintering aluminum wool or fibers. Anode 11 is formed, impregnated with manganese nitrate which is then converted to manganese dioxide, and coated with a conductive material (not shown). A solder pellet 12 is placed in the bottom of cathode can 13 and anode 11 is then positioned in can 13. Hermetic seal 14 comprising an outer metal ring 15, glass insulation disk 16 and an inner metal ring 17 is positioned over anode riser. The assembly is heated so as to melt solder pellets 12 and 19 to produce mechanical and electrical connection and secure seal 14. Cathode lead 20 is attached to can 13 and anode lead 21 is attached to anode riser 18 at weld 22. Opening 23 between ring 17 and riser 18 is soldered to insure a seal. It is to be understood that the novelty resides in the porous aluminum anode which is produced by the pressing and sintering of aluminum wool or fibers. The anode may be used in any type of capacitor wherein solid tantalum anodes are utilized.

As was previously mentioned, the electrodes may be produced in a number of shapes. For applications requiring a folded anode 24 as shown in FIGURE 2 or a rolled anode 25 as shown in FIGURE 3, the felted foil as hereinbefore described is used. The pressed slug anode 11, the folded anode 24 and the rolled anode 25 all provide low resistance, constant structure properties, and allow the production of inexpensive solid or liquid electrolytic capacitors.

The construction of the present invention as hereinbefore described is merely illustrative and not exhaustive in scope. Since many widely differing embodiments of the invention may be made without departing from the scope thereof, it is intended that all matter contained in the above description and shown in the accompanying drawings shall be interposed as illustrative and not in a limiting sense.

Having thus described our invention, we claim:

1. The method of making porous film-forming metal anodes for electrolytic capacitors having a porosity of from about 30–75 percent by volume comprising the steps of: mixing film-forming metal fibers with a non-corrosive liquid so that said fibers are suspended in said liquid, pouring said liquid carrying said suspended fibers over a perforated means allowing said fibers to settle on said perforated means, drying said fibers at a determined temperature, pressing said dried fibers at a pressure up to about 20,000 p.s.i., and sintering said pressed fibers, randomly arranged, at points of contact between adjoining fibers providing a porous film-forming metal anode having a porosity of about 30–75 percent by volume.

2. The method of making porous film-forming metal anodes for electrolytic capacitors having a porosity of from about 30–75 percent by volume comprising the steps of: mixing film-forming metal fibers with a non-corrosive liquid selected from the group consisting of hydrocarbon and organic alcohol so that said fibers are suspended in said liquid, pouring said liquid carrying said suspended fibers over a perforated means allowing said fibers to settle on said perforated means, drying said fibers at a determined temperature, pressing said fibers at a pressure up to about 20,000 p.s.i., and sintering said pressed fibers, randomly arranged, at points of contact between adjoining fibers providing a porous film-forming metal anode having a porosity from about 30–75 percent by volume.

3. The method of making porous film-forming metal anodes for electrolytic capacitors as claimed in claim 2 including the additional step of cutting strips of determined length from said intimately bonded fibers and rolling said lengths into convolutely wound anodes.

4. The method of making porous film-forming metal anodes for electrolytic capacitors as claimed in claim 2 including the additional step of cutting strips of determined length from said intimately bonded fibers and folding said lengths into an anode having a plurality of folds.

5. The method of making porous film-forming metal anodes for electrolytic capacitors as claimed in claim 2, wherein said film-forming metal fibers are aluminum fibers.

6. A porous anode for electrolytic capacitors comprising a mass of film-forming metal fibers randomly arranged and sintered together at points of contact between adjoining fibers, said sintered fibers forming a porous anode composed of continuous uninterrupted metal fibers formed into a mass, and said anode mass having a porosity from about 30–75 percent by volume.

7. A porous anode for electrolytic capacitors comprising a mass of film-forming metal fibers having a length of a few millimeters to a few centimeters and diameters in the micron range, said fibers randomly arranged and sintered together at points of contact between adjoining fibers, said sintered fibers forming a porous anode composed of continuous uninterrupted metal fibers formed into a mass, and said anode mass having a porosity from about 30–75 percent by volume.

8. A porous anode for electrolytic capacitors comprising a mass of aluminum fibers having a length of a few millimeters to a few centimeters and diameters in the micron range, said fibers randomly arranged and sintered together at points of contact between adjoining fibers, said sintered fibers forming a porous anode composed of continuous uninterrupted metal fibers formed into a mass, and said anode mass having a porosity from about 30–75 percent by volume.

9. An electrolytic capacitor comprising a container having an open end and a closed end, a porous anode positioned in said container, said anode comprising a mass of aluminum fibers randomly arranged and sintered together at points of contact between adjoining fibers, said sintered fibers forming a porous anode composed of continuous uninterrupted metal fibers formed into a mass, and said anode mass having a porosity from about 30–75 percent by volume, a dielectric film formed on the surface of said anode and said pores, an electrolye covering said film throughout said voids and including the exterior surface of said anode, an insulative means closing the open end of said container, and an anode riser connected to and extending from said anode and projecting through said insulative means.

10. An aluminum electrolytic capacitor comprising a container having an open end and a closed end, a porous anode positioned in said container, said aluminum anode comprising a mass of aluminum fibers randomly arranged and sintered together at points of contact between adjoining fibers, said sintered fibers forming a porous anode composed of continuous uninterrupted metal fibers formed into a mass, and said anode mass having a porosity from about 30-75 percent by volume, a dielectric film formed on the surface of said anode and said pores, an electrolyte covering said film throughout said voids and including the exterior surface of said anode, an insulative means closing the open end of said container, and an anode riser connected to and extending from said anode and projecting through said insulative means.

11. An aluminum electrolytic capacitor comprising a container having an open end and a closed end, a porous anode positioned in said container, said aluminum anode comprising a mass of aluminum fibers having a length of a few millimeters to a few centimeters and diameters in the micron range, said fibers randomly arranged and sintered together at points of contact between adjoining fibers, said sintered fibers forming a porous anode composed of continuous uninterrupted metal fibers formed into a mass, and said anode mass having a porosity from about 30-75 percent by volume, a dielectric film formed on the surface of said anode and said pores, an electrolyte covering said film throughout said voids and including the exterior surface of said anode, an insulative means closing the open end of said container, and an anode riser connected to and extending from said anode and projecting through said insulative means.

12. An aluminum electrolytic capacitor comprising a container having an open end and a closed end, a porous anode positioned in said container, said aluminum anode comprising a mass of aluminum fibers having a length of a few millimeters to a few centimeters and diameters in the micron range, said fibers randomly arranged and sintered together at points of contact between adjoining fibers, said sintered fibers forming a porous anode composed of continuous uninterrupted metal fibers formed into a mass, and said anode mass having a porosity from about 30-75 percent by volume, a polarized dielectric film formed on the surface of said anode and said pores, a solid electrolyte of manganese dioxide covering said film throughout said voids and including the exterior surface of said anode, an insulative means closing the open end of said container, and an anode riser connected to and extending from said anode and projecting through said insulative means.

13. An aluminum electrolytic capacitor as claimed in claim 12, wherein said anode is convolutely wound aluminum felt.

14. An aluminum electrolytic capacitor as claimed in claim 12, wherein said anode is folded felt aluminum.

References Cited
UNITED STATES PATENTS

| | | | |
|---|---|---|---|
| 2,277,687 | 3/1942 | Brennan | 317—230 |
| 2,278,161 | 3/1942 | Brennan | 317—230 |
| 2,299,667 | 10/1942 | Waterman | 317—230 |
| 2,616,165 | 11/1952 | Brennan | 317—230 |
| 3,166,693 | 1/1965 | Haring et al. | 317—230 |
| 3,196,323 | 7/1965 | Rogers et al. | 317—230 |

JAMES D. KALLAM, *Primary Examiner.*